United States Patent [19]

MacKenzie, Jr.

[11] 3,957,719

[45] May 18, 1976

[54] METHOD OF HEAT TREATING AN ETHYLENE CONTAINING POLYMER ELECTRICAL INSULATING COMPOSITION AND PRODUCT FORMED THEREBY

[75] Inventor: Burton Thornley MacKenzie, Jr., Monroe, Conn.

[73] Assignee: General Electric Company, New York, N.Y.

[22] Filed: Aug. 8, 1974

[21] Appl. No.: 495,866

[52] U.S. Cl............................ 260/42.42; 260/42.29; 260/42.33; 260/42.45; 264/140; 264/174; 264/345
[51] Int. Cl.².................... C08K 5/54; C08K 5/01; B29F 3/10; B29B 3/00
[58] Field of Search ........... 264/174, 331, 235, 236, 264/346, 347, 234, 345, 217, 140; 260/42.29, 42.42, 42.33, 42.45

[56] References Cited
UNITED STATES PATENTS

| | | | |
|---|---|---|---|
| 2,663,909 | 12/1953 | Maier et al. ........................ | 264/331 |
| 2,930,083 | 3/1960 | Vostorich et al. ................ | 260/42.39 |
| 3,121,768 | 2/1964 | Boyer................................. | 264/331 |
| 3,148,169 | 9/1964 | Marteno et al. ................. | 260/42.42 |
| 3,802,913 | 4/1974 | MacKenzie, Jr. ................ | 117/119.8 |

*Primary Examiner*—Robert F. White
*Assistant Examiner*—James B. Lowe
*Attorney, Agent, or Firm*—Raymond G. Simkins; Philip L. Schlamp; Frank L. Neuhauser

[57] ABSTRACT

The power factor of electrical insulating materials comprising clay-filled ethylene-containing polymeric compounds is reduced by the presence therein of an organoalkoxysilane and heat treating the admixed compound thereof at a temperature of about 120°F to about 200°F for at least about 24 hours prior to forming or molding to shape.

23 Claims, No Drawings

METHOD OF HEAT TREATING AN ETHYLENE CONTAINING POLYMER ELECTRICAL INSULATING COMPOSITION AND PRODUCT FORMED THEREBY

BACKGROUND OF THE INVENTION

Organopolysiloxanes and organosilanes have for some time been used to improve certain electrical properties or to provide new attributes in electrical insulations comprising ethylene-containing polymeric compositions filled with clay. Note, for example, U.S. Pat. Nos. 3,148,169; 3,795,646; and 3,802,913, and a technical paper entitled: "The Effect Of Silane Coupling Agents In Improving The Properties Of Filled Or Reinforced Thermoplastic" by Sterman and Marsden, published by the Society of Plastics Engineers, Inc., *Technical Papers*, Volume XI, 21st annual technical conference, Mar. 1 – Mar. 4, 1965.

These organic silicon compounds are generally included in such electrical insulating materials for the purpose of overcoming the effects of moisture and/or clays which adversely influence the electrical properties and electrical insulating performance of polymeric compositions.

However, in the higher voltage carrying transmission cables such as about 5 KV and above, it has been necessary to subject newly produced insulated cable products to a prolonged "ovenizing" or high temperature treatment to achieve an acceptable low power factor of about 0.75% or less, regardless of the presence of significant amounts of such organopolysiloxanes or organosilanes.

Ovenizing or heat treating comprises the traditional means for enhancing electrical properties in polymeric insulations for high voltage service. This treatment reduces the water contents of the insulating materials which, among other possible sources, results from the conventional use of high pressure sources, results from the conventional use of high pressure steam for the curing of thermosetting insulations or other components of the cable covering.

SUMMARY OF THE INVENTION

This invention comprises the discovery that very low and acceptable power factors can be achieved in thermoset cured, clay-filled ethylene-containing polymeric electrical insulations by means of an advantageous and economical method. The method of this invention comprises the combination of the addition of an organoalkoxysilane to a thermosetting curable ethylene-containing polymeric compound containing clay filler, and heating the admixed compound of the ingredients to relatively moderate temperatures prior to molding it to shape and curing the shaped product to a thermoset condition.

OBJECTS OF THE INVENTION

It is a primary object of this invention to provide a method of producing electrical insulations comprising clay-filled ethylene-containing polymeric compounds having a low power factor.

It is also an object of this invention to provide an improved method of manufacturing electrical cable insulated with thermoset, clay-filled ethylene-containing polymeric compounds having a low power factor.

It is a further object of this invention to provide an advantageous and economical method of producing a thermoset ethylene-containing polymeric compound filled with clay having a power factor of less than about 0.75%.

It is an additional object of this invention to provide a curable, clay-filled ethylene-containing polymeric molding compound having a power factor of less than about 0.75%.

DESCRIPTION OF A PREFERRED EMBODIMENT

Electrical insulations comprising thermoset cured, ethylene-containing polymeric compounds filled with clay and having a low power factor of less than about 0.75% are expeditiously produced according to this invention by means of a combination of the composition, or ingredients thereof, coupled with a specific sequence of processing conditions acting thereon, as set forth hereinafter in detail.

Insulating compositions which are the subject of this invention comprise curable or thermosettable compounds primarily composed of an ethylene-containing polymer and peroxide curing agent therefor, clay filler, and an organoalkoxysilane in amounts of about 1 to about 5 parts by weight per 100 parts by weight of clay filler.

The ethylene-containing polymer component comprises polyethylene, which may be used alone or blended with other polymers or copolymers, and copolymers of ethylene and other polymerizable materials such as vinyl acetate or propylene. Suitable copolymers of ethylene include, for example, ethylene-propylene rubbers, ethylene-propylene terpolymers, and ethylene-vinyl acetate containing at least about 50 mole percent of ethylene, and preferably about 70 mole percent thereof.

Peroxide curing agents comprise organic peroxides such as a tertiary peroxide, and characterized by at least one unit of the structure

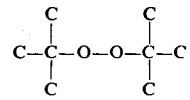

which decomposes at a temperature above about 295°F. The use of these free radical forming peroxide curing agents in effecting cross-link curing of polymers, such as polyethylene or ethylene-containing polymer compounds, is described in U.S. Pat. Nos. 2,888,424; 3,079,370; 3,086,966; and 3,214,422. A preferred peroxide is di α cumyl peroxide, and other suitable peroxides comprise the tertiary diperoxides such as 2,5-dimethyl-2,5-di(t-butyl peroxy) hexane and 2,5-dimethyl-2,5-di(ti-butyl peroxy) hexyne-3, and the like diperoxy and polyperoxide compounds.

Clay fillers of this invention comprise natural or synthetic materials predominately composed of aluminum silicate and substantially exhibiting the attributes of mineral clays. Natural clay products are preferably calcined to minimize water and organic contents. Clay fillers are typically added to ethylene-containing polymeric compounds in amounts up to about 100 parts by weight per 100 parts by weight of polymer, and preferably for higher ethylene content polymers, about 25 to about 75 parts by weight per 100 parts of polymer.

Organoalkoxysilanes for the practice of this invention comprise alkyl alkoxy silanes wherein the alkyl groups have at least one carbon atoms, and the vinyl alkoxy silanes. Suitable silanes include methyl triethoxysilane, ethyl triethoxysilane, n-hexyl trimethoxysilane, dodecyl trimethoxysilane, α-metharcyloxy-propyl trimethoxysilane and amyl triethoxysilane, and the vinyl silanes such as vinyl tris (2-methoxy-ethoxy) silane, vinyl trimethoxy silane, and vinyl triethoxy silane, and mixtures thereof. The silane component of this invention is present in the clay-filled electrical insulation in amount of about 1 to about 5 parts by weight per 100 parts by weight of the clay contents thereof.

Electrical insulating compositions composed of the foregoing ingredients and having an initial low power factor are produced according to the method of this invention by prepairing an admixture or blended compound of the basic ingredients described hereinbefore, and heating the admixed compound thereof at moderate conditions of about 120°F to about 200°F, and preferably about 160°F to about 180°F, and maintaining the material at such temperatures for a period of at least approximately 24 hours. Typical conditions for the heat treatment comprise a temperature of about 170°F for a period of exposure of approximately 48 to approximately 90 hours. Exposure to temperatures of about 160°F to about 180°F generally need not exceed about 120 hours when treating the admixed compound in particulate form of relatively small discrete particle size, and extending the heating beyond such practical durations normally provides little, if any, further reduction in the power factor.

The aforesaid heating of the insulating compound should be carried out prior to its forming or molding to shape or to the form of a designed product, such a continuum or coating about a conductor, and its curing as such to a substantially permanent thermoset state and configuration. Moreover, as indicated above, it is highly preferred, in order to expedite the heating, that the admixed insulating compound be in a suitable particulate form such as powder, diced particles, beads or pellets, or elongated spaghetti-like strands or ropes, tapes or the like discrete bodies of relatively high surface area in relation to mass. Optionally such particulate forms can be of about 2mm to about 15 mm in their smallest dimension, and preferably comprise pellets measuring about ⅛ inch to about ¼ inch in diameter and length.

The resultant heat treated compound comprises a heat curable or thermosetting molding compound having a low power factor of less than about 0.5%. This low power factor molding compound has a good shelf life and can be stored for substantial periods or promptly utilized in the manufacture of products.

Following completion of the heating treatment of the admixed compound of the electrical insulation, the prepared and treated compound is thereafter shaped or formed to the product configuration by any suitable or conventional molding technique, such as extrusion molding of a coating or covering continuum about a wire or cable conductor, and then cured to a substantially permanent thermoset form by the application of heat to activate the peroxide curing agent in a conventional manner. Typical curing temperatures comprise about 300°F to about 400°F, and high pressure steam constitutes the commonest source of curing heat as is evident from the prior art.

The following examples demonstrate the scope and effects of the method of this invention and illustrate its practice. Specifically, the examples establish the criticality of the presence of an organoalkoxysilane and its distinctiveness in the practice of this invention with respect to organopolysiloxanes which have been more often used than organosilanes to overcome the deleterious effects of moisture and/or clay in electrical insulations.

Curable, clay-filled, ethylene-containing polymeric cable insulating compositions constituting examples illustrating this invention and also standards for comparison and evaluation therewith of the invention are set forth, in relative parts by weight, below:

INSULATING COMPOUND FORMULATIONS

| INGREDIENTS | 3009 STANDARD | | 3035 EXAMPLES | |
| --- | --- | --- | --- | --- |
| | A | B | I | II |
| Polyethylene | 100 | 100 | 100 | 100 |
| Clay filler | 50 | 50 | 50 | 50 |
| Silicone tetramer | 0.5 | 1.5 | — | — |
| vinyl-tris (2 methoxyethoxy) silane | — | — | 1.5 | 1.5 |
| Antioxidant - Flectol H (polymerized trimethyldihydroquinoline) | 1.75 | 1.75 | 1.75 | 1.75 |
| Carbon black | 5 | — | — | — |
| Titanium dioxide | — | — | 5 | — |
| Curing agent - Di Cup T (di α cumyl peroxide) | 3.55 | 3.55 | 2.85 | 3.55 |

The composition of Standard A had an initial power factor of 1.82% on cable after heat treating at about 180°F for 48 hrs. whereas the composition of Example I had an initial power factor of 0.4% after heat treating of about 167°F for 72 hrs.

Specimens of both of the compositions of Standard A and Example I, all in particulate form of pellets sized about ¼ × ¼ inch, were treated at different temperature levels of about 122°F, about 158°F and about 194°F in an air oven, and samples of both composition treated at each temperature level were removed for evaluation after 24 hours, 48 hours and 72 hours exposure at temperature. A sample of each of the specimens so treated was press cured in 75 mil thick slabs at 350°F for 15 minutes and cooled. The percent power factor, measured at room temperature at 500V 60Hz, for both the Standard and Example in relation to time of treatment at a given temperature is given in Table I, and in relation to temperature of treatment for a given time in Table II.

| | TABLE I | | | | | |
|---|---|---|---|---|---|---|
| | | STANDARD A | | | EXAMPLE I | |
| Temp°F | 122 | 158 | 194 | 122 | 158 | 194 |
| Time 24 hrs. | 1.10 | 0.65 | 0.77 | 0.20 | 0.20 | 0.20 |
| 48 hrs. | 1.29 | 0.77 | 0.95 | 0.19 | 0.19 | 0.19 |
| 72 hrs. | 0.95 | 0.85 | 0.63 | 0.20 | 0.20 | 0.17 |

| | TABLE II | | | | | |
|---|---|---|---|---|---|---|
| | | STANDARD A | | | EXAMPLE I | |
| Time, Hrs. | 24 | 48 | 72 | 24 | 48 | 72 |
| Temp. °F 122 | 1.10 | 1.20 | 0.93 | 0.20 | 0.20 | 0.20 |
| 158 | 0.65 | 0.77 | 0.84 | 0.20 | 0.20 | 0.20 |
| 194 | 0.73 | 0.95 | 0.63 | 0.19 | 0.19 | 0.17 |

In the following evaluation, the composition of Example I was extruded over a metal conductor and thereon heat cured, producing an insulated cable product. In some runs the insulation composition of Example I was applied to the conductor with no preliminary heat treatment, and specimens of the cable produced with untreated compound were ovenized at 194°F for 72 hrs. according to the conventional procedures and compared with specimens of the same cable which was not ovenized and with specimens prepared according to this invention. Other portions of the composition of Example I were treated in pellet form at 176°F for 72 hrs., in accordance with this invention, and thereafter extruded over a metal conductor and heat cured under the same conditions as the untreated material, for evaluation and comparison with the same composition applied under the conditions of the prior art. The percent power factor for the composition of Example I formed as a cable insulation according to the prior art and by the method of this invention are set forth in Table III below. The cable construction for the tests comprised: 2/0 AWG, 15 KV cable with 0.150 inch insulation thickness.

| | | TABLE III | | | | |
|---|---|---|---|---|---|---|
| Insulation | Insulated | Percent Power Factor | | | | |
| Compound | Cable | Cable Test KV | | | | |
| Treatment | Treatment | 7 | 10.5 | 14 | 21.9 | 26.3 |
| None | None | 1.275 | 1.274 | 1.277 | 1.292 | 1.304 |
| None | 194°F for 72 hrs. | 0.190 | 0.191 | 0.194 | 0.206 | 0.210 |
| None | None | 0.788 | 0.789 | 0.790 | 0.793 | 0.799 |
| None | 194°F for 72 hrs. | 0.184 | 0.189 | 0.203 | 0.210 | 0.212 |
| None | None | 2.197 | 2.223 | 2.250 | 2.310 | 2.353 |
| None | 194°F for 72 hrs. | 0.178 | 0.178 | 0.184 | 0.190 | 0.190 |
| Heat Treated | None | 0.436 | 0.443 | 0.442 | 0.446 | 0.448 |
| | None | 0.345 | 0.345 | 0.348 | 0.359 | 0.365 |
| 167°F for 72 hrs. | None | 0.364 | 0.364 | 0.371 | 0.380 | 0.389 |

In addition to producing a moldable and heat curable, clay-filled polymeric compound of a low initial power factor, the method of this invention provides for a substantial savng in the manufacture of insulated cable. By avoiding the need for heat treating oven or facility can be reduced and the quantity of heat energy expended to raise the metal conductor and other ancillary components of the cable product up to the temperature for the treatment of the filled polymer compound can be saved.

Although the invention has been described with reference to certain specific embodiments thereof, numerous modifications are possible and it is desired to cover all modifications falling within the spirit and scope of the invention.

What I claim as new and desire to secure by Letters Patent of the United States is:

1. A method of preparing an electrical insulation composed of a clay-filled, ethylene-containing polymeric compound and having a low power factor of less than about 0.75% comprising the steps of:
   a. admixing a compound comprising an ethylene-containing polymer comprising at least about 50 mole percent ethylene, clay filler, an organoalkoxysilane in an amount of about 1 to about 5 parts by weight per 100 parts by weight of the clay, and an organic peroxide curing agent;
   b. heat treating the admixed compound comprising the polymer, clay, organoalkoxysilane and curing agent by heating to a temperature of about 120°F to about 200°F for a period of at least approximately 24 hours;
   c. shaping the heat treated admixed compound to a predetermined configuration; and
   d. curing the shaped and heat treated admixed compound to a thermoset state by heating it to a temperature of within the approximate range of about 300°F to about 400°F.

2. The method of claim 1, wherein the organoalkoxysilane is vinyl-tris (2-methoxyethoxy) silane.

3. The method of claim 1, wherein the heat treating of the admixed compound comprising the polymer, clay, organoalkoxysilane and curing agent is carried out at a temperature of about 160°F to about 180°F for a period of about 48 to about 90 hours.

4. The method of claim 1, wherein the ethylene-containing polymer is selected from the group consisting of polyethylene, copolymerss of ethylene and other polymerizable materials, and blends of polyethylene and other polymers, and mixtures thereof.

5. The method of claim 1, wherein the ethylene-containing polymer is polyethylene.

6. A method of manufacturing electrical cable comprising a metallic conductor and an insulating covering thereabout including a clay-filled, thermoset ethylene-containing polymer material having a power factor of less than about 0.75%, comprising the steps of:
 a. admixing a compound comprising an ethylene-containing polymer comprising at least about 50 mole percent ethylene, clay filler, an organoalkoxysilane in an amount of about 1 to about 5 parts by weight per 100 parts by weight of clay, and an organic peroxide curing agent;
 b. heat treating the admixed compound comprising the polymer, clay, organoalkoxysilane and curing agent in particulate form by heating to a temperature of about 120°F to about 200°F for a period of approximately 48 to approximately 120 hours;
 c. molding the heat treated admixed compound as a continuum surrounding the conductor; and
 d. curing the molded and heat treated admixed compound to a thermoset state by heating it to a temperature of within the approximate range of about 300°F to about 400°F.

7. The method of claim 6, wherein the organoalkoxysilane is vinyl tris (2-methoxyethoxy) silane.

8. The method of claim 7, wherein the treating of the admixed compound comprising the polymer, clay, organoalkoxysilane and curing agent is carried out at a temperature of about 160°F to about 180°F for a period of about 48 hours to about 90 hours.

9. The method of claim 8, wherein the ethylene-containing polymer is selected from the group consisting of polyethylene, copolymers of ethylene and other polymerizable materials, and blends of polyethylene and other polymers, and mixtures thereof.

10. The method of claim 9, wherein the ethylene-containing polymer is polyethylene.

11. A method of preparing an electrical insulation composed of a clay-filled, thermoset ethylene-containing polymer compound and having a low power factor of less than about 0.75%, comprising the steps of:
 a. admixing a compound comprisng an ethylene-containing polymer comprising at least about 50 mole percent ethylene, clay filler, an organoalkoxysilane in an amount of about 1 to about 5 parts by weight per 100 parts by weight of the clay, and an organic tertiary peroxide curing agent;
 b. forming the admixed compound into pellets;
 c. heat treating the pellets of the admixed compound comprising the polymer, clay, organoalkoxysilane and curing agent to a temperature of about 120°F to about 200°F for a period of at least approximately 48 hours;
 d. molding the pellets of heat treated, admixed compound to an insulation of predetermined configuration; and
 e. curing the molded and heat treated admixed compound to a thermoset state by heating it to a temperature of within the approximate range of about 300°F to about 400°F.

12. The method of claim 11, wherein the admixed compound is formed into pellets sized about ⅛ inch to about ¼ inch.

13. The method of claim 12, wherein the organoalkoxysilane is vinyl tris (2-methoxyethoxy) silane.

14. The method of claim 13, wherein the heat treating of the admixed compound comprisng the polymer, clay, organalkoxysilane and curing agent is carried out at a temperature of about 160° to about 180°F for a period of about 72 hours.

15. The method of claim 14, wherein the ethylene-containing polymer is selected from the group consisting of polyethylene, copolymers of ethylene and other polymerizable materials, and blends of polyethylene and other polymers, and mixtures thereof.

16. The method of claim 15, wherein the ethylene-containing polymer is polyethylene.

17. A method of preparing an electrical insulation composed of a clay-filled, thermoset ethylene-containing polymeric compound having a low initial power factor of less than about 0.75%, comprising the steps of:
 a. admixing a compound comprising polyethylene, clay filler, vinyl tris (2-methoxyethoxy) silane in an amount of about 1 to about 5 parts by weight per 100 parts by weight of the clay, and an organic tertiary peroxide curing agent;
 b. forming the admixed compound into pellets;
 c. heat treating the pellets of the admixed compound by heating to a temperature of about 160°F to about 180°F for a period of about 48 to about 120 hours;
 d. extrusion molding the heat treated admixed compound about a conductor to form a covering thereabout; and
 curing the molded covering of heat admixed compound by heating to a temperature of about 300°F to about 400°F.

18. A method of preparing a clay-filled, thermosettable ethylene-containing polymeric compound for electrical insulation having an initial power factor of less than about 0.75%, comprising the steps of: admixing a compound comprising an ethylene-containing polymer comprising at least about 50 mole percent ethylene, clay filler, an organoalkoxysilane in an amount of about 1 to about 5 parts by weight per 100 parts by weight of the clay, and an organic peroxide curing agent; and heating treating the admixed compound comprising the polymer, clay, organoalkoxysilane and curing agent by heating to a temperature of about 120°F to about 200°F for a period of at least approximately 24 hours.

19. The product of the method of claim 18 having an initial power factor of less than about 0.75%, comprising the admixed thermosettable compound comprising an ethylene-containing polymer, clay filler, an organoalkoxysilane in an amount of about 1 to about 5 parts by weight per 100 parts by weight of the clay, and an organic peroxide curing agent, which has been treated by heating to a temperature of about 120°F to about 200°F for a period of at least about 24 hours.

20. The thermoset product of the method of claim 18 having an initial power factor of less than about 0.75% and which has been cured, comprising the admixed cured compound comprising an ethylene-containing polymer, clay filler, an organoalkoxysilane in an amount of about 1 to about 5 parts by weight per 100 parts by weight of the clay, and an organic peroxide curing agent, which has been treated by heating to a temperature of about 120°F to about 200°F for a period of at least about 24 hours.

21. A method of preparing a clay-filled, thermosettable ethylene-containing polymeric compound for electrical insulation having an initial power factor of less than about 0.75%, comprising the steps of: admixing a compound comprising at least one ethylene-containing polymer comprising at least 50 mole percent ethylene selected from the group consisting of polyethylene, copolymers of ethylene and other polymerizable materials, and blends of polyethylene and other polymers, clay filler in an amount of about 25 to about 100 parts by weight per 100 parts by weight of ethylene-containing polymer, an organoalkoxysilane in an amount of about 1 to about 5 parts by weight per 100 parts by weight of the clay filler, and an organic tertiary peroxide curing agent; forming the admixed compound into discrete particles; and heat treating the admixed compound comprising the polymer, clay, organoalkoxysilane and curing agent by heating to a temperature of about 160°F to about 180°F for a period of about 48 to about 120 hours.

22. The product of the method of claim 21 having an initial power factor of less than about 0.75%, comprising the admixed thermosettable compound comprising an ethylene-containing polymer, clay fillter, an organoalkoxysilane in an amount of about 1 to about 5 parts by weight per 100 parts by weight of the clay, and an organic peroxide curing agent, which has been treted by heating to a temperature of about 160°F to about 180°F for a period of about 48 to about 120 hours.

23. The thermoset product of the method of claim 21 having an initial power factor of less than about 0.75% and which has been cured, comprising the admixed cured compound comprising an ethylene-containing polymer, clay filler, or organoalkoxysilane in an amount of about 1 to about 5 parts by weight per 100 parts by weight of the clay, and an organic peroxide curing agent, which has been treated by heating to a temperature of about 160°F to about 180°F for a period of about 48 to about 120 hours.

* * * * *

UNITED STATES PATENT OFFICE
CERTIFICATE OF CORRECTION

PATENT NO. : 3,957,719
DATED : May 18, 1976
INVENTOR(S) : Burton Thornley Mac Kenzie, Jr.

It is certified that error appears in the above-identified patent and that said Letters Patent are hereby corrected as shown below:

Claim 4, line 3, - cancel "copolymerss" and insert - copolymers -

Claim 6, line 10, - before "clay" insert - the -

Claim 14, line 4, - cancel "160° to" and insert - 160°F to -

Claim 17, line 19, - before "curing" insert - e. -

Claim 17, line 19, - cancel "heat admixed" and insert - heat treated admixed -

Claim 18, line 10, - cancel "heating treating" and insert - heat treating -

Claim 21, line 6, - cancel "at least 50 mole" and insert - at least about 50 mole -

Claim 22, line 4, - cancel "clay fillter" and insert - clay filler -

Signed and Sealed this

Eighteenth Day of October 1977

[SEAL]

Attest:

RUTH C. MASON
Attesting Officer

LUTRELLE F. PARKER
Acting Commissioner of Patents and Trademarks